(12) United States Patent
Barkan

(10) Patent No.: US 7,355,594 B2
(45) Date of Patent: Apr. 8, 2008

(54) OPTICAL TOUCH SCREEN ARRANGEMENT

(75) Inventor: Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 596 days.

(21) Appl. No.: 10/956,694

(22) Filed: Sep. 30, 2004

(65) Prior Publication Data

US 2006/0066584 A1    Mar. 30, 2006

(51) Int. Cl.
*G09G 5/00* (2006.01)

(52) U.S. Cl. .................................. 345/173; 345/156

(58) Field of Classification Search ......... 345/173–182
See application file for complete search history.

(56) References Cited

U.S. PATENT DOCUMENTS 4,507,557 A *  3/1985  Tsikos ..................... 250/341.7
6,421,042 B1 *  7/2002  Omura et al. ............... 345/157

* cited by examiner

*Primary Examiner*—Duc Q Dinh
(74) *Attorney, Agent, or Firm*—Kirschstein et al.

(57) ABSTRACT

An optical touch screen arrangement includes two optical cameras arranged so that their planar fields of view intersect each other in a touch area situated adjacent a display screen operative for displaying visual prompts to solicit action from a user. The user's finger, or a pen, entering the touch area is detected, as is the user's signature.

12 Claims, 2 Drawing Sheets

OPTICAL TOUCH SCREEN ARRANGEMENT

BACKGROUND OF THE INVENTION

1. Field of the Invention

The present invention generally relates to touch screens and, more particularly, to optical touch screens having signature capture capability.

2. Description of the Related Art

Touch screens and signature capture devices are well known on personal digital assistants, payment terminals, and portable computers designed for various markets. These touch/signature capture screens have made use of various technologies. Each of these, however, has some disadvantages.

The most common type of technology is found on hand-held personal digital assistants. These use flexible membrane technology that has not proven to be adequately durable for demanding commercial applications. In addition, the membranes are positioned over the display, reducing the brightness and contrast of the display.

Other technologies include capacitive sensors mounted on the screen, as well as infrared (IR) light emitting diodes (LEDs) positioned around the periphery of the screen. The most reliable of these is the IR sensor technology, which consists of an array of photosensors along two sides of a display, and a corresponding array of IR light sources, such as LEDs, along the opposite sides. The sensors detect when a finger or pen touches the screen by detecting that the IR light from the opposite LED is no longer visible to a sensor. While this kind of technology works well for sensing finger touches in applications such as automated teller machines, where high resolution of the location of the touch is not necessary, signature capture, while possible, requires such a dense population of sensors and LEDs as to become too expensive and to use too much power for some applications. In addition, custom arrays of LEDs and sensors have to be created for each size of screen that is to be accommodated.

SUMMARY OF THE INVENTION

Objects of the Invention

Accordingly, it is a general object of this invention to provide a durable optical touch screen arrangement which requires no delicate, flexible membranes to wear out or become damaged.

More particularly, it is an object of the present invention to provide an optical touch screen arrangement which does not reduce screen brightness or contrast.

Still another object of the present invention is to provide an optical touch screen arrangement which is easily adapted to a variety of screen sizes.

It is yet another object of the present invention to provide an optical touch screen arrangement which has minimal power consumption.

Features of the Invention

In keeping with the above objects and others which will become apparent hereinafter, one feature of the present invention resides, briefly stated, in an optical touch screen arrangement comprising a housing, a display screen mounted thereon, and a pair of linear optical imagers or cameras mounted on the housing. Each imager has a row of light sensors, for example, a charge coupled device (CCD) array or a complementary metal oxide semiconductor (CMOS) array, for detecting light over a generally planar field of view.

In accordance with this invention, the imagers are so positioned that their fields of view intersect each other to bound a touch area situated adjacent the display screen. These intersecting fields of view are located just above the surface of the display screen. A finger, a pen, or the like touching the display screen must pass through the touch area, in which case, both imagers detect the entry into the touch area and responsively generate electrical position signals. A signal processor processes the position signals to determine the unique location of the entry.

Hence, there are no flexible membranes to wear out or become damaged, as in the prior art. Screen brightness or contrast is not affected. Power consumption is low. The dual imager mounting is easily adapted to a variety of screen sizes.

In the preferred embodiment, the display screen is generally rectangular, and the two imagers are mounted in the two upper corners, each field of view preferably measuring less than 90°, thereby defining the touch area to overlie a central region of the display screen. The display screen displays visual prompts to solicit action from a user. For example, the prompts can be numbered buttons to solicit entry of a personal identification number, or a signature line to solicit the user's signature, or a message asking the user to swipe his or her credit card in an adjacent card reader to complete payment for a transaction. Whenever the user, either by means of a finger, or a pen, enters the touch area, the two imagers detect the entry.

In some cases, both imagers are not needed to capture user information. For example, the display screen could display a contact area outside of the touch area. The user is prompted to touch the contact area for capture by only one of the imagers. There can only be a single screen prompt in the contact area because it is not possible to resolve the exact location of a touch without a second imager.

Although ambient light can be used, more reliable image capture and results are obtained if an illumination system is built into the arrangement. The illumination system may illuminate a frame surrounding the screen, especially with infrared light to which the imagers are sensitive, or illumination light emitting diodes can be mounted near each imager. Another variation is to place a reflector on a tip of a pen, or to place a light emitting diode at the pen tip, for better results.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
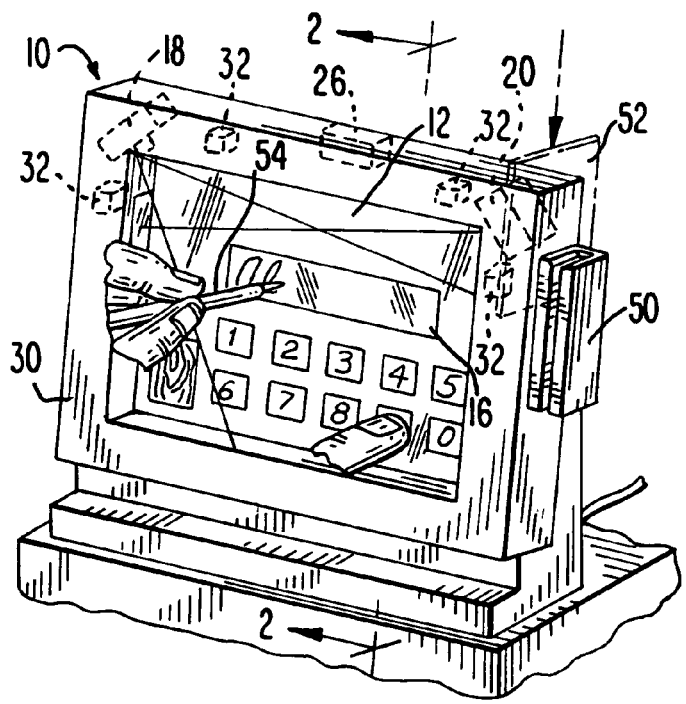
FIG. 1 is a perspective view of an optical touch screen arrangement according to this invention.
Figure 2:
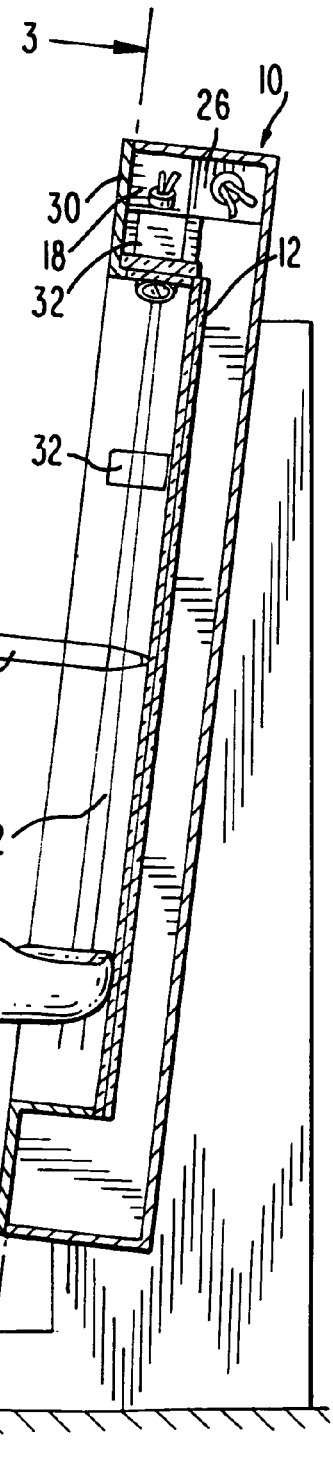
FIG. 2 is an enlarged sectional view taken on line 2-2 of FIG. 1.

Reference numeral 10 depicts a typical embodiment that would be used as a payment terminal, such as would be used to capture a signature when paying with a credit card 50 swiped through a card reader 52 at a department store. In this application, a screen 12 having a size typically around 4 inches by 5 inches is used. The screen 12 will display a numeric keypad 14 (buttons 0-9) when a consumer is to enter a personal identification number when paying with the card 50, or it can display a box 16 in which the consumer is required to place his/her signature when paying.

In a preferred embodiment, two single line imaging cameras 18, 20 are used to locate the point where a user, or a pen 54, touches the screen 12, or to follow the location of a pen tip 56 as the user writes a signature. The cameras are located at two corners of the screen, such as at the upper left corner and at the upper right corner, but not at diagonally opposite corners (unless more than two cameras are used as described below). Each camera includes an optical system that provides the camera with a field of view. Fields of view equal to 90° would allow each camera to see an object touching the screen anywhere over the entire screen. Fields of view of less than 90° can be used if it is not necessary to detect touches over the entire screen area.

The single line imaging cameras 18, 20 have fields of view 22, 24 each of which lies in a thin plane, typically not exceeding one millimeter in thickness. Anything entering this plane can be seen by the cameras. The cameras are positioned so that the planes of their fields of view are located just above the surface of the display screen, so that anything touching the display screen must pass through the field of view.

Each camera uses an array sensor such as a CCD sensor or a CMOS sensor. These sensors have a row of individual sensors. The output of each of these sensors is examined by a microprocessor 26 to determine if an object was in the part of the field that the particular sensor can see. If an object was there, it is a simple matter to calculate the angle of the object's position with respect to the center axis of the camera's field of view. This angular information from the two cameras defines a unique location on the surface of the screen.

In a typical embodiment, sensors with 2048 pixels can be used. This would provide resolution of around 300 dots per inch in the center of the 4 inch by 5 inch screen, which is adequate for signature capture. When capturing a signature, the arrays will have to be scanned fast enough to track the motion of the pen tip 56 as it moves along the screen, to build up an image of the entire signature. In most cases, the signature will be displayed on the screen as the user writes, as a form of helpful and natural feedback for the user.

The cameras 18, 20 require adequate illumination to allow accurate detection of objects within their fields of view. While ambient light can be used, more reliable results are possible if an illumination system is built into the touch screen assembly. There are several ways this can be done. One way is to illuminate a frame 30 around the screen with LEDs which could shine through transparent material out of which the frame is constructed. The LEDs can be infrared, which might be most pleasing to users who do not expect the frame of the touch screen to be visibly illuminated. The sensors are also more sensitive to infrared light, giving a stronger signal and making it easier to detect objects. When an object touches the screen, it obscures the camera's view of the illuminated frame, making a distinct difference in brightness between the object and the surrounding frame.

Another possibility is to have illumination LEDs 32 mounted near each camera and positioned so as to illuminate any object positioned in front of the camera. In this situation, the frame around the display should optimally have a dark color for maximum contrast between an object that touches the screen and the background.

A third possibility is to have the illumination LEDs 32 located near each camera just as described above, but to use the pen 54 with a highly reflective tip 56 to make the tip look brighter than the background.

Yet another possibility is to provide the pen 54 with an illuminated tip 56, which can also be infrared if desired. An advantage of using infrared is that optical filters can be positioned in each camera's optical system to minimize the influence of ambient light.

The various embodiments described above consume different amounts of power, making some more suitable for some applications than others. The configuration with the illuminated frame uses the most power, because it will likely require several LEDs to illuminate each side of the frame. Note, only three sides of the frame need to be illuminated. The side between the cameras does not need illumination. The design with LEDs located near the cameras uses less power, because adequate illumination will only require one or two LEDs per camera. The design with the LED in the tip of the pen uses the least power because only a single LED is needed.

In all of the embodiments, power can be minimized by turning on the LEDs only during the exposure time (also known as the integration time) of the cameras. In addition, the LEDs can be entirely turned off at times when no input is expected. For example, no input to a payment terminal is expected until the credit or debit card 52 is swiped, so that the LEDs can be turned off until that time. They can be turned off again when the transaction is completed.

Since this invention does not require anything such as a membrane or capacitive sensor to be positioned over the display screen, it is possible to protect the screen from damage by using a scratch-resistant window over the display. For example, a window of tempered glass or of synthetic sapphire could be used, making the screen extremely durable. If a glass window is used, the scratch resistance can be increased by using one of the commercially available diamond-like coatings.

Figure 3:
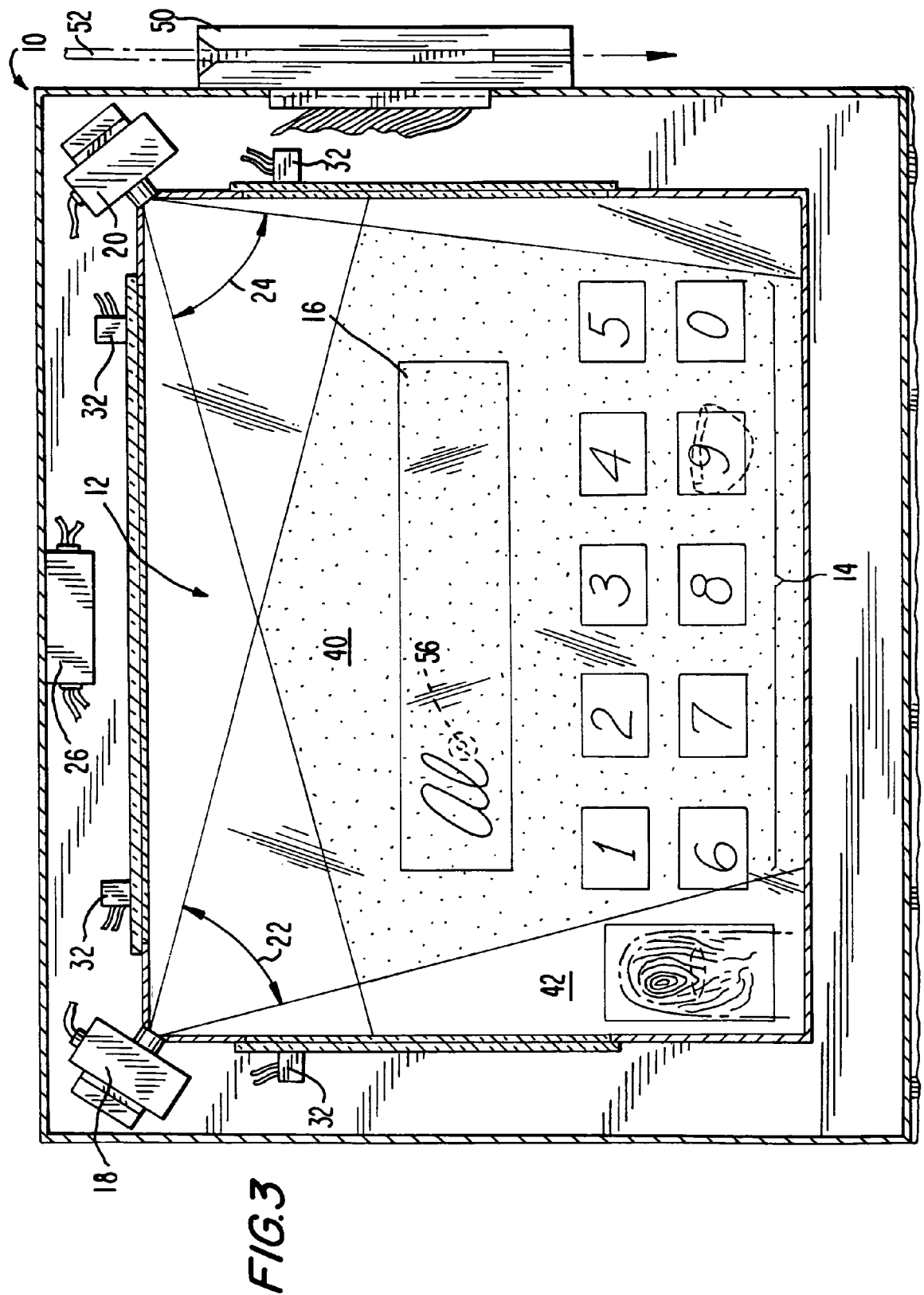
FIG. 3 is a front elevational view, with the frame removed, of the arrangement of FIG. 1 taken on line 3-3 of FIG. 2.

FIG. 3 shows the two cameras 18, 20, each near one upper corner of the display, with the frame 30 removed. The fields of view of the two cameras overlap in a touch area 40 indicated by stippling in front of the display. This is the area where a touch can be detected because both fields of view overlap. A touch in a contact area 42 where only the single camera 20 can see it can also be detected, but cannot be accurately located with respect to its position on the screen. Even so, this capability can be useful.

The entire screen is not covered by the overlapping fields of view of the two cameras. In many applications, such as a payment terminal, it will not be necessary to sense touches or capture signatures near the edges of the display. Hence, an arrangement such as shown will be adequate. If it is necessary to cover the entire display, cameras with a wider field of view can be used, or the cameras can be moved away from the display screen to allow their fields of view to grow before they get to the screen. It is also important to realize that the description of the invention above is only of a preferred embodiment. Such changes as using more than two cameras for more complete coverage of the display, are also within the scope of this invention.

Another advantage of this advantage is that the two cameras can be used for various size screens without changing the camera design. When used on larger screens, the resolution of each sensor will become reduced as distance from the camera increases. In many cases, this will not be a problem, especially if the far end of the screen is only used for touch sensing and not signature capture, which requires high resolution.

It will be understood that each of the elements described above, or two or more together, also may find a useful application in other types of constructions differing from the types described above.

Thus, this invention can also be used for signature capture even in applications that do not require a display under the touch sensing area. Examples of this are portable computers and payment terminals where a user writes a signature on a tablet that does not have a display at all, or where the display is located just above the writing area. This invention's extreme durability will still be advantageous even if there is not a display underneath.

This invention could also be used as a mouse pad for a computer, or as a pointing device for CAD systems, photo editing applications, etc. where a user moves a stylus on a writing surface while watching how a cursor moves on a display screen that is not underneath the writing surface. Another possibility is to build the cameras into a frame that fits over the screen of a conventional desktop or laptop computer enabling touch or pen input to an otherwise conventional computer.

While the invention has been illustrated and described as embodied in an optical touch screen arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An optical touch screen arrangement, comprising:
   a) a housing;
   b) a display screen mounted on the housing and operative for displaying visual prompts to solicit action from a user;
   c) a pair of linear optical imagers on the housing and having respective, generally planar fields of view adjacent the display screen and intersecting each other to bound a touch area occupying a major fraction of area overlying the display screen, a minor fraction of the area overlying the display screen being located in the field of view of only one of the imagers, the imagers having respective rows of light sensors for detecting an entry into the touch area and for generating electrical position signals, one of the prompts being a contact area in which only one touch is optically captured by the one imager; and
   d) a signal processor for processing the position signals to determine a location of the entry in the touch area.

2. The arrangement of claim 1, wherein each imager is one of a charge coupled device and a complementary metal oxide semiconductor device.

3. The arrangement of claim 1, wherein the display screen has a plurality of corners, and wherein the imagers are mounted at two of the corners.

4. The arrangement of claim 3, wherein each field of view measures less than 90° and defines the touch area at a central region of the display screen.

5. The arrangement of claim 1, wherein another of the prompts is a signature area in which a handwritten signature is optically captured by the imagers.

6. The arrangement of claim 1, and an illuminator for illuminating the fields of view of the imagers.

7. The arrangement of claim 6, wherein the illuminator includes a plurality of infrared light emitting diodes mounted on the housing for illuminating the fields of view with infrared light.

8. The arrangement of claim 6, wherein the illuminator includes a light source mounted in a tip of a pen for touching the display screen.

9. The arrangement of claim 6, and a pen for touching the display screen, the pen having a reflective tip for reflecting light from the illuminator.

10. The arrangement of claim 1, and a card reader on the housing.

11. The arrangement of claim 1, wherein another of the prompts is a numeric keypad.

12. The arrangement of claim 1, and a scratch resistant window overlying the display screen.

* * * * *